United States Patent [19]

McNeill et al.

[11] Patent Number: 5,555,791
[45] Date of Patent: Sep. 17, 1996

[54] BEVERAGE DISPENSING APPARATUS HAVING ARTICULATING BASKET HOLDING ARMS FOR BASKETS HAVING VARYING DIMENSIONS

[75] Inventors: Robert C. McNeill, Jeffersonville, Ind.; Thomas J. Pfeifer, Louisville, Ky.

[73] Assignee: Grindmaster Corporation, Louisville, Ky.

[21] Appl. No.: 438,175

[22] Filed: May 9, 1995

[51] Int. Cl.$^6$ ..................................... A47J 31/18
[52] U.S. Cl. ........................ 99/295; 99/304; 210/480
[58] Field of Search ............................ 99/279, 295, 281, 99/300, 304, 323, 292; 210/480, 481

[56]                References Cited

U.S. PATENT DOCUMENTS

| | | | |
|---|---|---|---|
| 3,187,663 | 6/1965 | McLean, Jr. et al. | 99/299 |
| 3,861,285 | 1/1975 | Martin | 99/304 |
| 3,975,996 | 8/1976 | Vitous | 99/304 |
| 4,191,100 | 3/1980 | Marotta | 99/304 |
| 4,721,034 | 1/1988 | Shimomura | 99/299 |
| 4,749,134 | 6/1988 | Van Camp . | |
| 4,759,273 | 7/1988 | Kauffman | 99/279 |
| 4,794,853 | 1/1989 | Weber | 210/480 |
| 4,867,048 | 9/1989 | Brewer | 99/295 |
| 4,893,758 | 1/1990 | Foley et al. . | |
| 4,913,037 | 4/1990 | Newnan | 99/295 |
| 5,197,374 | 3/1993 | Fond | 99/300 |

Primary Examiner—Frankie L. Stinson
Assistant Examiner—James F. Hook
Attorney, Agent, or Firm—Wheat, Camoriano, Smith & Beres, PLC

[57] ABSTRACT

The present invention involves a grinder/brewer coffee beverage dispensing apparatus having a pair of basket support arms with front end portions adapted to grasp beverage baskets and a configuration essentially complimentary to the circular shapes of beverage baskets. The arms are pivotally mounted for simultaneous horizontal and vertical movement with respect to the frame of the beverage dispensing apparatus, permitting the arms to graps baskets having varying flange widths and diameters.

15 Claims, 6 Drawing Sheets

BEVERAGE DISPENSING APPARATUS HAVING ARTICULATING BASKET HOLDING ARMS FOR BASKETS HAVING VARYING DIMENSIONS

BACKGROUND OF THE INVENTION

The present invention relates to a beverage dispensing apparatus which has a container in which the solid ingredients are mixed with a liquid transported to the container and more particularly with a beverage dispensing apparatus having a pair of arms to grasp a container in which the solid ingredients of the beverage are mixed with the liquid ingredients.

Beverage dispensing apparatus such as coffee brewers generally are provided with arms or slots to support the lip of the brewing basket into which the hot water is distributed over the ground coffee spread therein. Typical consumer coffee makers today have slots formed by a pair of guide rails into which the flange of a brew basket is positioned when the basket is filled with ground coffee. The rails are positioned on either side of the hot water dispensing openings in the underneath surface of the brewer. The top surface of the flange is placed into an abutting engagement with the underneath surface of the coffee maker to minimize the escape of water vapor when in operation. Consequently, consumers ordinarily must purchase replacement baskets specifically designed for the coffee maker.

There have been attempts in the designs of grinders primarily designed for the commercial or restaurant market to accommodate for varying diameter of the baskets as illustrated in U.S. Pat. No. 4,893,758 issued Jan. 16, 1990 and assigned to Bunn-O-Matic. This patent disclose the use of a pair of leaf springs that flex apart upon insertion of a basket therebetween and due to the complimentary shape of the springs with the external surface of the basket. The structure of the leaf spring apparatus permits the insertion of baskets having varying diameters. This is important contribution since there is no universal standard for the size of brewing baskets and it becomes awkward if an operator has to manually adjust the arms to accept baskets whenever the diameter changes. Additionally, this type of arm configuration does not create a need to contain the steam emanating from the brewing operation when hot water is distributed over the ground coffee.

The prior art, however, does not address the twin problems of varying flange widths and basket diameters. If a basket with a flange of a width greater than the width of the slots defined by guide rails is used in a guide rail design, then the only solution is to manually adjust the guide rails to increase the width of the slots. This is usually not practical. With arm support designs, the arms must be repositioned manually or else the basket flange will not be accepted by the apparatus or be ill positioned with respect to the underneath surface of the brewing apparatus. Similarly, brew baskets unfortunately are not standardized, thus the distance between rails is often insufficient to accommodate a brew basket, for example, that is larger than the one usually purchased and accompanying the brewer.

Thus, a paramount object of the present invention is to provide for a beverage dispensing device in which the support arms for a beverage mixing basket can accept baskets with wide diameter ranges while simultaneously accepting wide ranges of baskets in which the top flange width also may vary.

It is another object of the present invention to provide for a beverage dispensing device having support arms that can articulate horizontally and vertically.

It is a further object of the present invention to provide for simple construction of beverage basket support arms that can articulate horizontally and vertically while maintaining the basket in a centered position beneath the beverage dispenser.

It is yet another object of the present invention to provide for simple construction of beverage basket support arms that can accommodate beverage baskets of varying diameter and support flanges while maintaining an effective seal against the escape of steam emanating when hot water is being distributed over the solid ingredients in the basket.

It is still a further object of the present invention to provide for a construction of a beverage basket support sub-assembly that is both easily positioned within the housing of an apparatus for the preparation of a beverage and that includes beverage basket support arms that can pivot about both a vertical and horizontal axis so as to receive beverage baskets of differing diameters and flange thicknesses.

SUMMARY OF THE PRESENT INVENTION

The present invention involves a grinder/brewer coffee beverage dispensing apparatus having a sub-assembly including a pair of basket support arms that can be easily inserted and removed from the apparatus. The basket support arms have front portions adapted to grasp beverage baskets and a configuration essentially complimentary to the circular shapes of beverage baskets. The arms are pivotally mounted for simultaneous horizontal and vertical movement with respect to the frame of the beverage dispensing apparatus, and provide for a seal about the basket when in position to minimize the escape of moisture during mixing irrespective of the thickness of the flange lip of the beverage apparatus. The front portions of the arms are biased toward one another in the horizontal plane and together with a supporting frame structure upward toward the underneath surface of the apparatus. A basket placed between the arms causes the arms to open and grasp the basket below the circumferentially disposed flange of the basket with the complimentary configuration of the arms. The flange itself causes the arms to simultaneously pivot downwardly, the amount of which depends upon the thickness of the flange. The upward bias of the arms promotes the abutment of the top surface of the flange with the underneath surface so as to seal about the water openings and thus minimize the escape of water vapor during the brewing operation.

DETAILED DESCRIPTION OF THE PREFERRED EMBODIMENT

Figure 1:
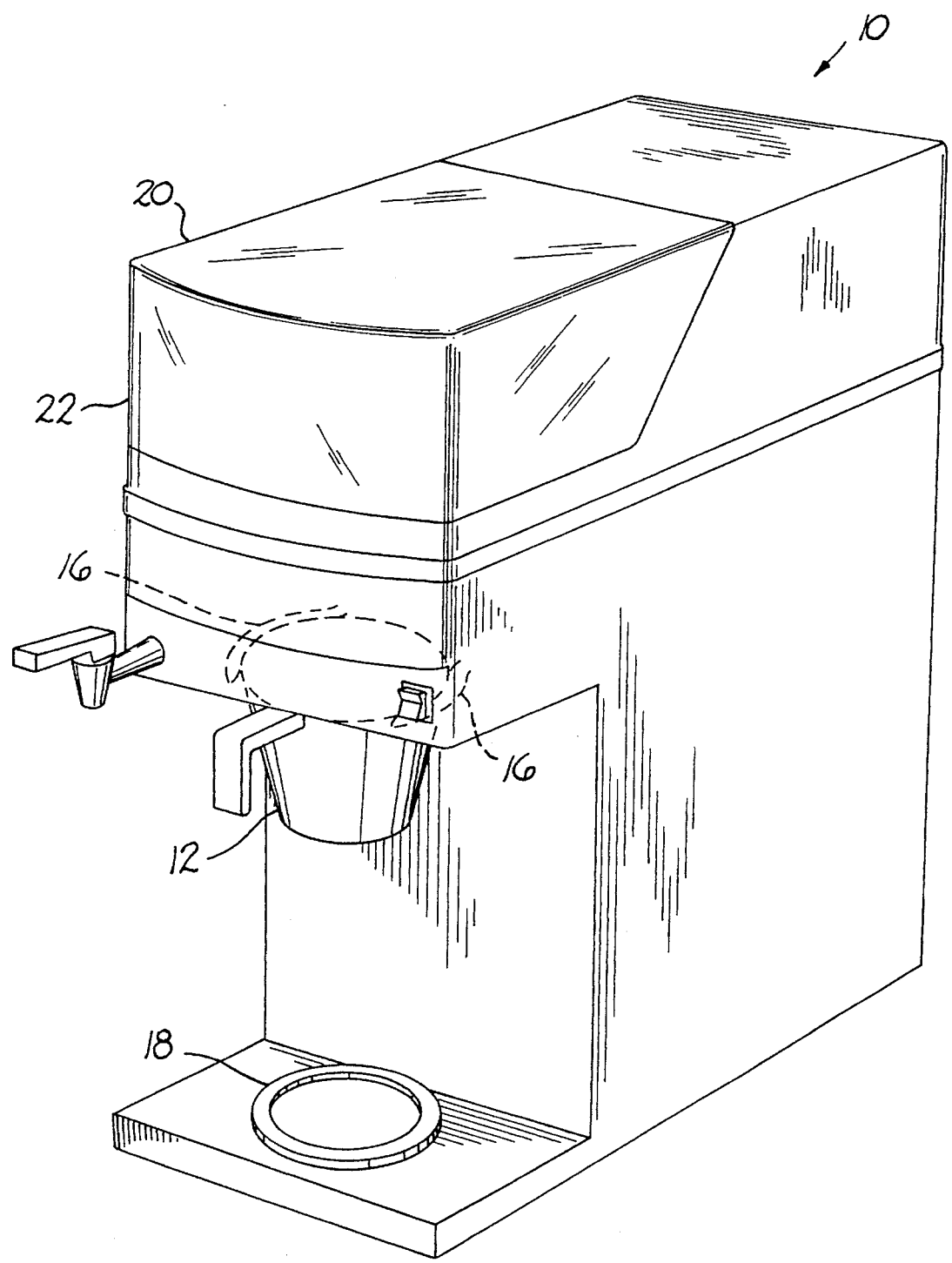
FIG. 1 is a perspective view of a grinder-brewer apparatus with which the present invention may be used.
Figure 14:
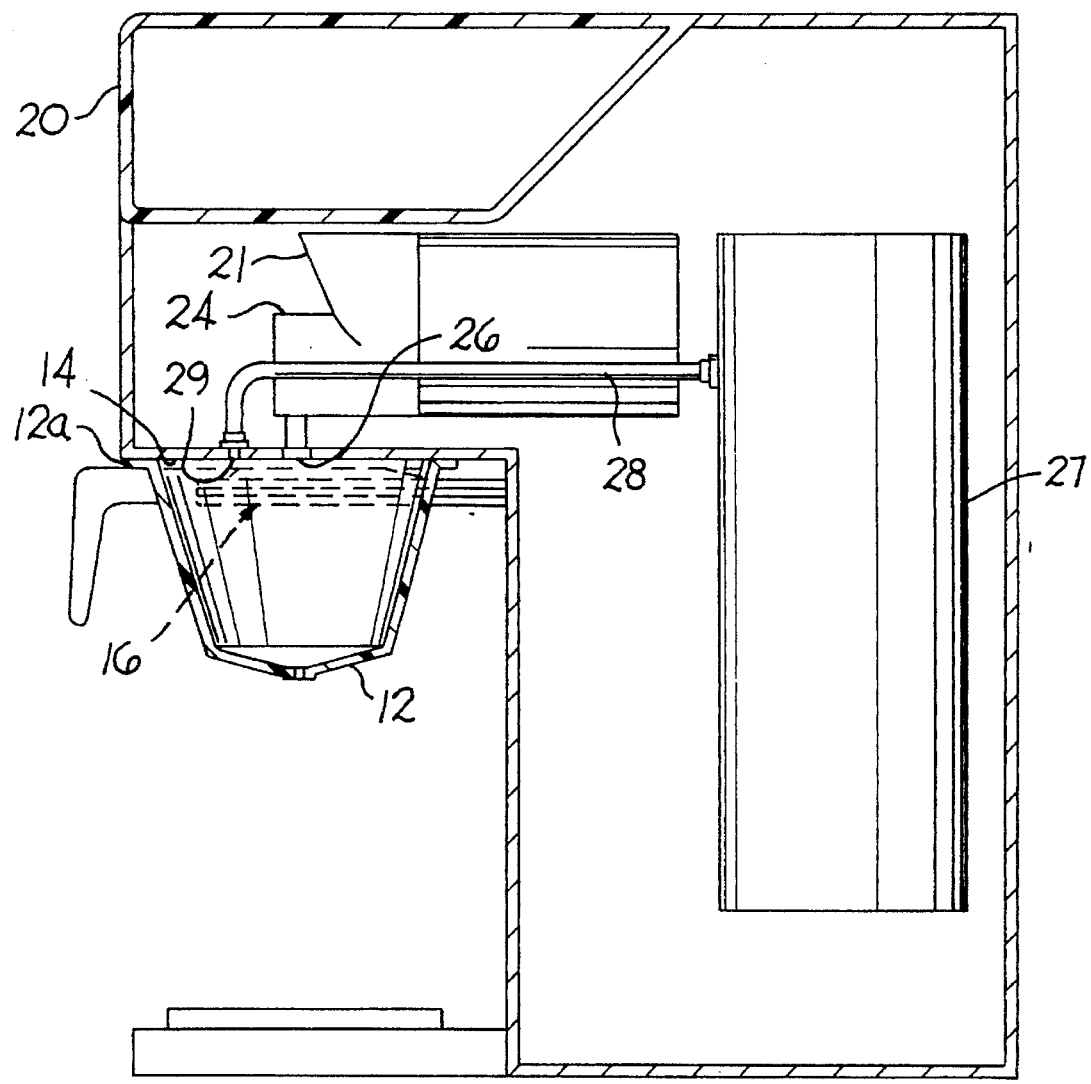
FIG. 14 is a side view of the apparatus of FIG. 1 schematically showing a hot water tank, grinder and various openings in the underneath surface of the apparatus for distribution of the hot water and ground coffee into the basket.

The perspective of FIG. 1 illustrates a beverage producing apparatus 10 which may be, for example, a grinder brewer combination apparatus for the grinding of coffee beans and the brewing of the resulting ground coffee. Such apparatus are provided with components to store and heat water, for transporting the heated water to a location where the water is mixed with a particulate such as ground coffee, for grinding coffee beans to produce the ground coffee, and for transporting the grounds to a region in which the grounds are mixed with water for brewing a coffee beverage. FIG. 14 illustrates schematically the various elements of such an apparatus.

A brewing basket 12 is positioned firmly against the underneath surface 14 of apparatus 10 by a pair of arms shown generally by character numeral 16. A decanter (not shown) is usually in position beneath basket 12 on warming plate 18. The beans are stored in a hopper 20 which may have transparent walls 22 in part for viewing or may be bifurcated to house more than one type of coffee bean. The beans move from hopper 20 into grinder 24, are ground, and then moved through opening 26 in surface 14 above basket 12 where the grounds are evenly distributed into brewing basket 12 lined with a filter paper of choice. Hot water is then distributed from a hot water tank 27 along hot water line 28 through openings 29 in surface 14 into brewing basket 12 and brewing commences.

Figure 2:
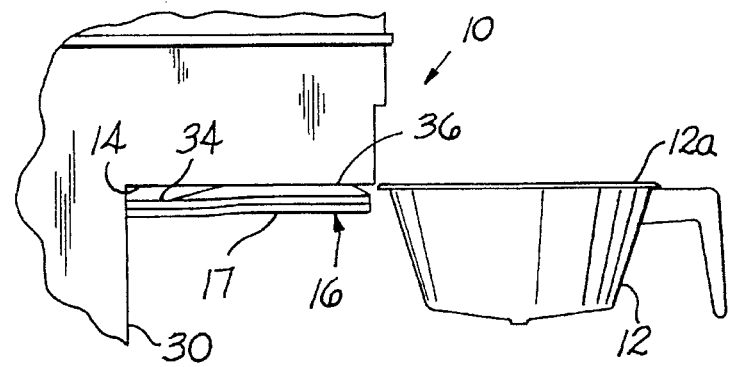
FIG. 2 is a side view in schematic form demonstrating the positioning of the articulating arms of the present invention located on the housing of the grinder brewer just prior to insertion of a basket between the arms and illustrating the structure of the upper surface of each articulating arm.
Figure 3:
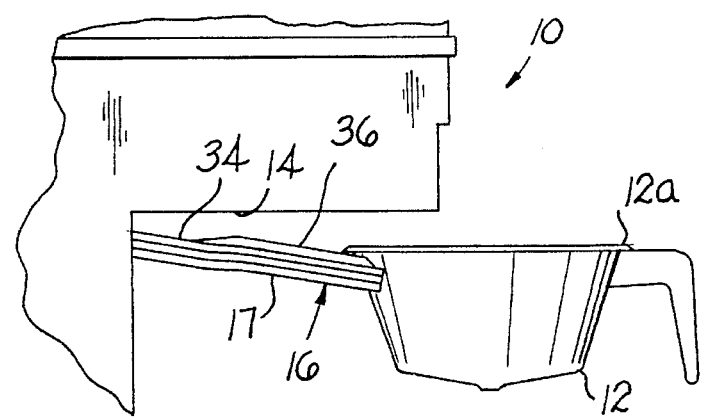
FIG. 3 is a view identical to that shown by FIG. 2 in which the brew basket is being inserted between the articulating arms and causing a downward movement of the arms.
Figure 4:
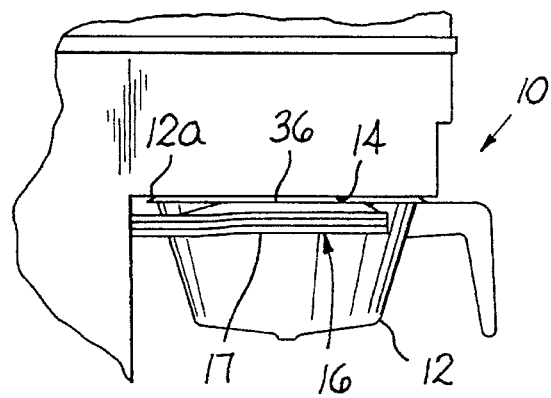
FIG. 4 is a view identical to that shown in FIG. 2 in which the brew basket is positioned in is final position between the arms in which the arms press the basket upward against the underneath surface of the housing of the grinder brewer.

As best seen in FIGS. 2, 3, and 4, arms 16 extend through an opening (not shown) in the front wall 30 of apparatus 10 and are biased into a substantially parallel relationship with respect to underneath surface 14. Because each arm 16 is pivotally mounted (as discussed below) at a point intermediate the ends thereof, it is simpler to discuss the arms with respect to the rear portion, i.e. the interior portion on the other side of the pivot point and the front or exposed portion extending out from front wall 30. Each of the front portions 17 is provided with a top surface 34 having a camming configuration or element 36. Each camming element 36 initially slopes upward from surface 34 at a point adjacent the distal end of front portion 17. As perhaps best seen in FIGS. 5, 6, and 7, front portions 17 are curved to provide a region essentially complimentary to the exterior surface of basket 12 for effective grasping thereof below flange 12a.

Figure 5:
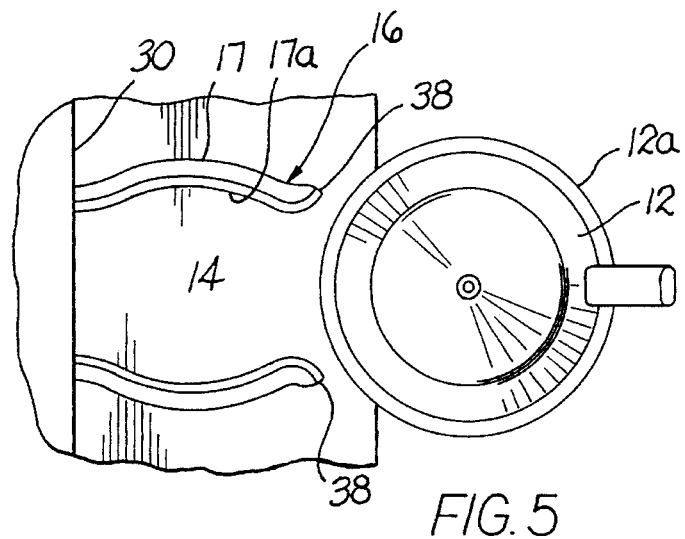
FIG. 5 is a bottom view in schematic form demonstrating the articulating arms of the present invention located on the housing of the grinder brewer just prior to insertion of a brewing basket between the arms.
Figure 6:
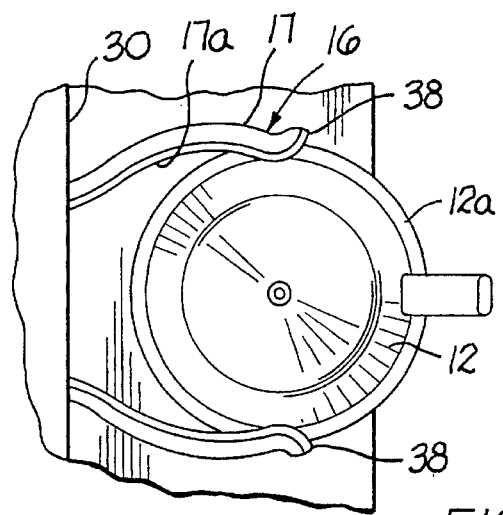
FIG. 6 is a view identical to that shown in FIG. 5 except that the brewing basket is being inserted between the arms causing the arms to move apart.
Figure 7:
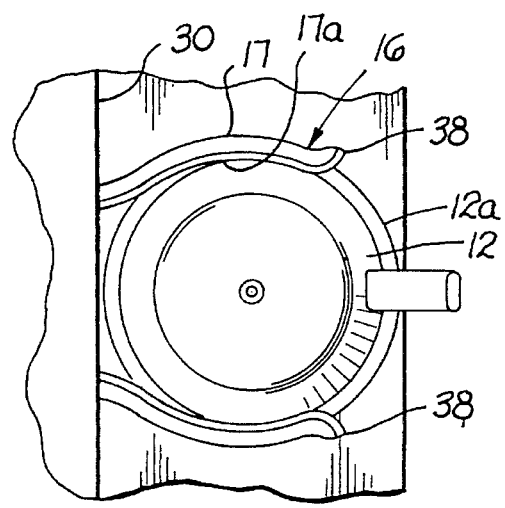
FIG. 7 is a view identical to that shown in FIG. 5 except that the brewing basket is positioned in its final position or sealed between the arms.

As basket 12 is pushed between the basket grasping front portions 17, the portions simultaneously move downward and spread apart. The former motion is best seen in FIGS. 2, 3, and 4 while the latter is depicted in FIGS. 5, 6, and 7. Initially, the basket is pushed between front portions 17, causing a spreading of front portions 17 while flange 12a of brew basket 12 moves between front portions 17 and the underneath surface 14 of the dispenser. After a short distance, flange 12a begins to engage camming element 36, causing arms 16 to pivot downwardly as seen in FIG. 3. In its proper operating position between front portions 17, basket 12 is pressed upward such that the rim of the basket circumferentially abuts and provides a seal with underneath surface 14 as shown in FIG. 4.

It is important that camming first occur at or near the first point of engagement of front portions 17 with basket 12. Otherwise, the leading edge of flange 12a may begin to descend relative to front portions 17 and become tilted with respect to underneath surface 14. Thus, the front parts of camming elements 36 are located near or at distal ends 38 and engages flange 12a at almost the point of insertion. Thus, some portions of camming elements 36 are in contact with flange 12a continuously into the sealed position of basket 12 in FIG. 4.

Figure 8:
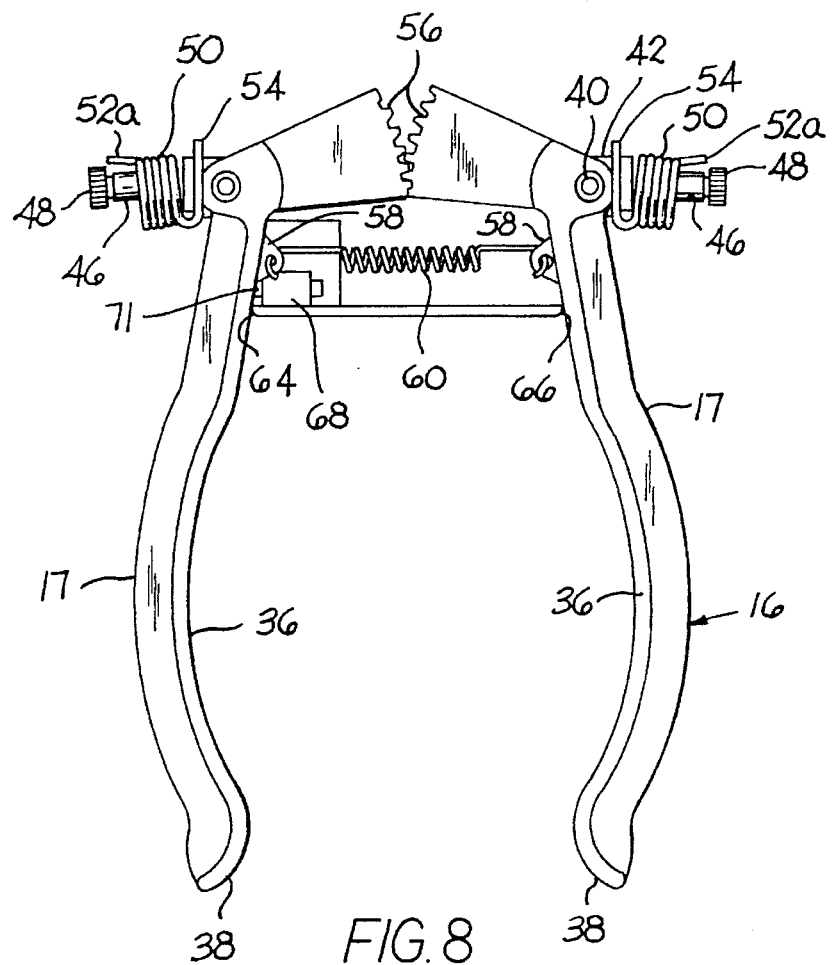
FIG. 8 is a bottom view of the articulating arms of the present invention without the housing of the grinder brewer present.
Figure 9:
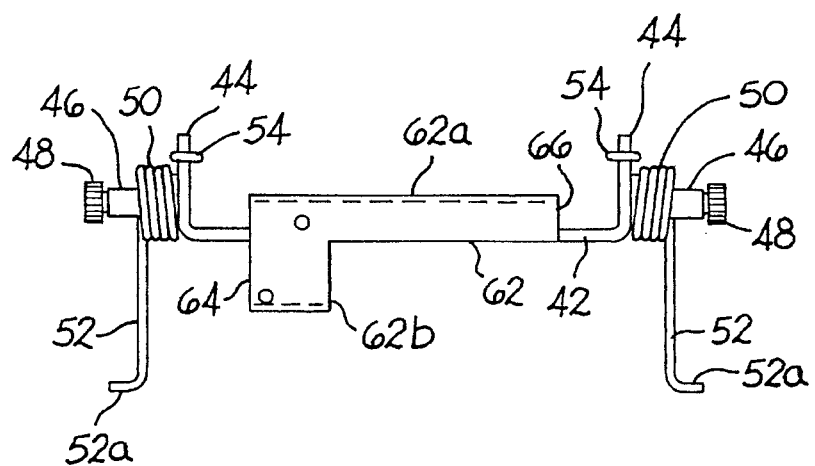
FIG. 9 is a front view of the support structure of the articulating arms.

The operative relationship of the components of the articulating arm sub-assembly of the present invention may be best understood by reference first to FIGS. 8 and 9. Arms 16 are shown pivotally mounted intermediate its ends about removable bolts 40 secured to a bracket 42. Bracket 42 has a pair of right angle flanges 44 each spaced slightly from bolts 40. Extending outwardly from each flange 44 is a pivot pin 46 with a cap 48 of greater diameter than the pivot pin shank secured to the distal end thereof. A helical torsion spring 50 is wrapped about a portion of the shank of each pin 46. Each spring 50 is provided with a downwardly extending first leg 52 with outwardly turned distal ends 52a (adapted to be secured to the side of the housing of apparatus 10 as described below) and a second leg 54 bent around and secured to the top part of each flange 44.

The rear portions of each arm 16 are provided with a gear element 56 inwardly canted with respect to the major axis of arms 16 permitting the gear elements 56 to operably engage or mesh. Additionally, each arm 16 has an extension 58 positioned on front portions 17 to which a spring 60 is secured biasing front portions 17 toward one another when no basket is positioned therebetween, i.e., the basket arm "closed position". The closed position is best seen in FIGS. 5 and 8. The operative engagement of the gear elements 56 ensure that front portions 17 move apart simultaneously along the identical length of arc segment about bolts 40 and thus that basket 12 is centered beneath surface 14.

Support bracket 42 extends beneath spring 60 and has an upwardly and downwardly extending flange 62 that has opposite edges 64 and 66 serving as stops for front portions 17 in the closed position as seen in FIG. 8. The upper extension 62a of flange 62 serves as a guard for spring 60 while the lower extension 62b serves as a mount for a switch 68 positioned so as to have button 71 depressed when arms 16 are in the closed position. Switch 68 provides, among other functions, a feature preventing grinding and/or brewing from occurring when the basket is either not placed between the arms or is incorrectly positioned. The specific features of the basket switch 68 are not part of this invention and are explained in more detail in concurrently filed and commonly assigned U.S. Application Serial Number (Attorney Docket 0001/207).

Figure 10:
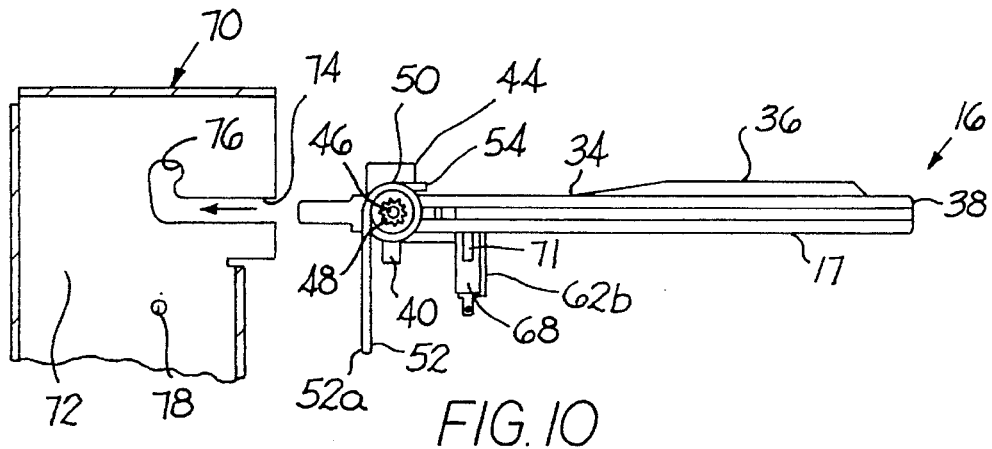
FIGS. 10–12 are side views of the articulating arm sub-assembly progressively being inserted into the housing of a grinder brewer beverage apparatus.
Figure 11:
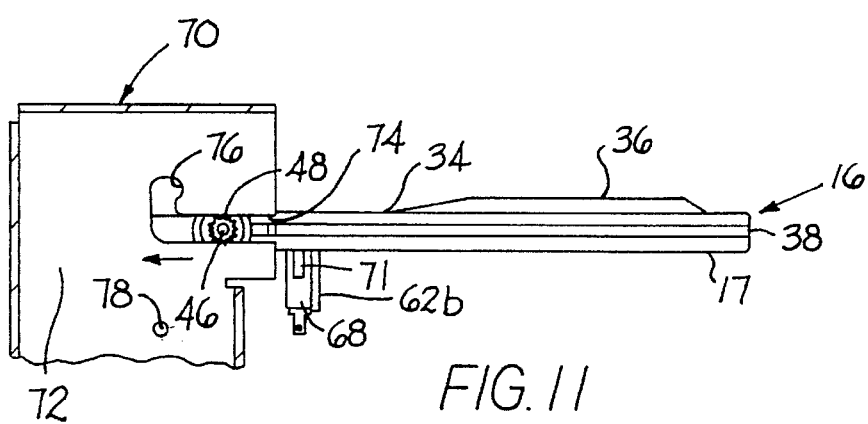
Figure 12:
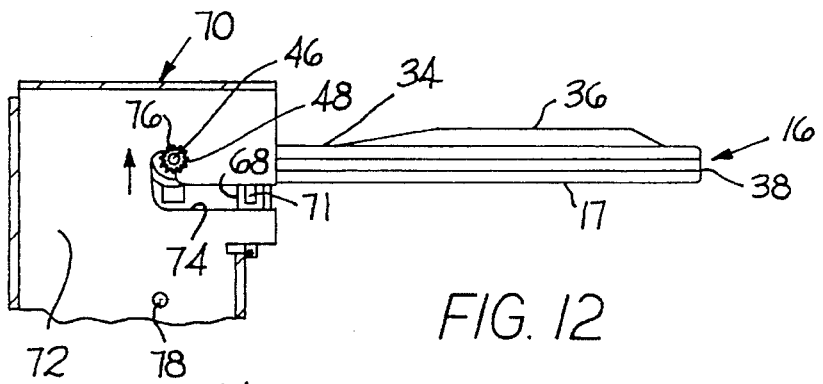
Figure 13:
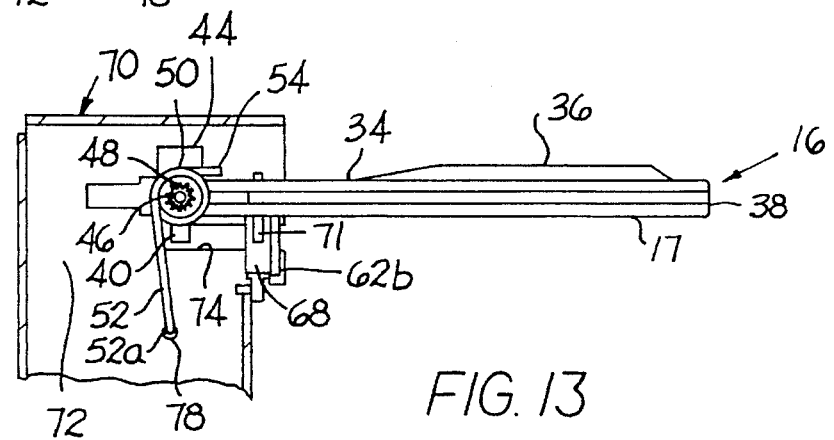
FIG. 13 is a side sectional view of the articulating arm support structure in its operative position within the housing of a grinder brewer beverage apparatus.

As seen in FIGS. 10–12, the sub-assembly comprising arms 16, the support structure, and biasing elements is easily mounted to the housing (shown generally as character numeral 70). The sub-assembly is inserted as shown in FIG. 10 through an opening in the front of housing 70 so that the shanks of pins 46 can easily slide along slots 74 defined in sides 72. The larger diameter caps 48 abut the outside surface of sides 72. To insert the sub-assembly into housing 70, the downwardly extending legs 52 of spring 50 are pinched inwardly. When the sub-assembly is pushed against the back of slots 74, the shanks of pins 46 are caused to ride upward until they become positioned within openings 76 while the outwardly turned distal ends 52a of legs 52 become registered with and pop into apertures 78 of housing sides 72. Once distal ends 52a are engaged with apertures 78, the articulating arm sub-assembly is secured in its operative position relative to housing 70.

Thus, when an operator of the apparatus initially urges a basket 12 between the basket grasping front portions 17 of arms 16, front portions 17 articulate horizontally outwardly against the inward biasing force of spring 60 which together with meshing gears 56 maintain identical inward pressure on the sides of basket 12 and the basket centered with respect to surface 14. Simultaneously, the entire sub-assembly is forced downward by engagement of the lip or flange 12a of basket with the top surface 34 and camming element 36 against the upward biasing force supplied by springs 50. Once the basket is pushed into position, the curved region of front portions 17 grasp basket 12 just below flange 12a. Under the force of springs 50, flange 12a is pressed into an abutting engagement with surface 14, providing for the sealing function discussed above. The amount of downward pivot of the sub-assembly and front portions 17 is largely a function of the thickness of the flange.

As is readily evident from the discussion above, the articulating arms of the present invention accept baskets of varying diameter without requiring the manually adjustment of the arms and additionally urge the basket of whatever diameter into an abutting engagement with the underneath surface of apparatus 10 irrespective of the thickness of the flange 12a. The present invention provides an economical and universal solution to the problem of varying basket diameter and flange thickness.

I claim:

1. An improvement in an apparatus for the dispensing of beverages, said apparatus having a system for supplying and dispensing of a liquid over particulate beverage flavoring material located in a basket detachably secured to an underneath surface of said apparatus by a pair of arms associated with the frame of said apparatus, said arms having front end portions biased for grasping said basket beneath a substantially horizontal flange circumscribing the upper perimeter of said basket, said underneath surface having openings for the dispensing of liquids therethrough into said basket when positioned beneath said underneath surface, said improvement comprising a sub-assembly structure removably inserted into and attached to the apparatus and capable of a pivoting movement in a substantially vertical plane, said sub-assembly structure including said pair of arms biased into a rest position when a basket is not positioned therebetween, said front portions being provided with a surface for engaging said flange of said basket when said basket is pushed into position between said front end portions and beneath said underneath surface, said support structure including said arms being downwardly pivoted from said rest position proportionally to the thickness of said flange thereby providing continuous upward pressure against said flange and promoting a substantially gaseous tight seal about said openings independently of the thickness of said flange.

2. The improvement of claim 1 in which said pair of arms are operatively engaged to each other for movement in substantially the same plane and are commonly biased in said substantially the same plane so that said front end portions are urged toward each other into a closed position.

3. The improvement of claim 2 in which each of said arms are pivotally mounted to a supporting bracket of said sub-assembly structure.

4. The improvement of claim 3 in which said supporting bracket is pivotally mounted to said frame to provide movement of said sub-assembly in said substantially vertical plane.

5. The improvement of claim 4 including a spring element for biasing said supporting bracket and said sub-assembly toward said rest position.

6. The improvement of claim 5 in which said spring element comprises a pair of springs with one distal end thereof secured to said supporting bracket and a second distal end secured to the frame of said apparatus.

7. The improvement of claim 6 in which said springs are helical torsion springs circumscribing a pin fixed to and extending from a flange member of said supporting bracket.

8. The improvement of claim 4 in which said arms are provided with connecting gearing for said concurrent movement in said substantially horizontal plane.

9. The improvement of claim 8 in which a spring element operatively connects and biases said front end portions of said arms toward said closed position.

10. An apparatus for the grinding of coffee beans and the brewing of coffee from ground coffee including a pair of articulating arms having front end portions for grasping and holding a basket beneath said apparatus, said basket having a flange of a predetermined thickness adapted to be inserted between an underneath surface of said apparatus and upper surfaces of said portions of said arms thereby providing a moisture seal about water distribution openings in said underneath surface when said basket is positioned between said portions of said arms, said front end portions essentially having a configuration essentially complimentary to the exterior surface of said basket abutting said front end portions, said arms mounted on a supporting bracket and being biased so as to pivot said front end portions toward one another for grasping said basket when inserted between said front end portions, said supporting bracket being pivotally mounted to said apparatus beneath said underneath surface and being biased upwardly toward said underneath surface thereby causing the flange of said basket when said basket is mounted between said front end portions to be pressed against said underneath surface.

11. The apparatus of claim 10 including a pair of biasing springs for upwardly biasing said bracket.

12. The apparatus of claim 11 in which said springs are torsional springs, each of said springs having a first distal end connected to said bracket and a second distal end connected to said apparatus.

13. The apparatus of claim 10 in which each said arms are pivotally mounted to said bracket at a point intermediate said front end portions and a distal end thereof, each of said distal ends of said arms defining a gear element, said gear elements intermeshing with one another so that said front end portions move uniformly toward or away from each other when pivoted, said apparatus further including a biasing element connecting said arms to bias said front end portions of said arms toward each other.

14. The apparatus of claim 10 in which each said front end portions have a camming surface adapted to engage the flange of said basket when inserted therebetween thereby causing said front end portions to yield downwardly to accept said flange and to press said flange upwardly against the underneath surface of said apparatus to provide the moisture seal about said water distribution openings independent of the thickness of the flange.

15. The apparatus of claim 14 in which said front end portions of said arms are curved to approximate the curvature of a basket, said camming surface on each of said front end portions extending around the curvature of said front end portions and ending near the end of said front end portions.

* * * * *